Feb. 9, 1954 W. J. DE WITT ET AL 2,668,590
FISHHOOK MAKING
Filed March 28, 1946 5 Sheets-Sheet 2

Inventors
William J. DeWitt
Herbert A. Corbett
By their Attorney

Feb. 9, 1954   W. J. DE WITT ET AL   2,668,590
FISHHOOK MAKING
Filed March 28, 1946   5 Sheets-Sheet 4

Inventors
William J. DeWitt
Herbert A. Corbett
By their Attorney

Feb. 9, 1954  W. J. DE WITT ET AL  2,668,590
FISHHOOK MAKING
Filed March 28, 1946  5 Sheets-Sheet 5

Inventors
William J. DeWitt
Herbert A. Corbett
By their Attorney

Patented Feb. 9, 1954

2,668,590

UNITED STATES PATENT OFFICE 2,668,590

FISHHOOK MAKING

William J. De Witt and Herbert A. Corbett, Auburn, N. Y., assignors, by mesne assignments, to Auburn Fishhook Company, Inc., Auburn, N. Y., a corporation of New York Application March 28, 1946, Serial No. 657,794

3 Claims. (Cl. 164—48)

This invention relates to fish hook making and, more particularly, to a method of and mechanism for pointing fish hook blanks. The invention is illustrated as embodied in an automatic fish hook making machine of the type disclosed in United States Letters Patent No. 2,379,886, granted July 10, 1945, upon application filed in the names of W. J. De Witt et al.

In pointing blanks, such as fish hook blanks, by means of automatic machines, considerable difficulty has heretofore been experienced in producing uniform blanks with smooth, well-centered points. Accordingly, it is an object of the present invention to provide improved mechanism for forming pointed blanks which will be particularly effective in its operation in that it will rapidly point blanks with a minimum of crippled blanks and provide a product which is uniform in shape.

To this end, and as herein illustrated, we have provided mechanism, in a machine of the type referred to, including means for feeding wire a predetermined distance past an operating station, thus to control the length of the blank to be produced, and mechanism for shearing the wire at the operating station simultaneously in two places, at right angles to and at an acute angle to the axis of the wire, thus to produce a blank having a partially formed pointed end and, at the same time, to form the butt end of a succeeding blank. Preferably, and as shown, the wire, when it is fed, is received in a chuck carried by a turret, there being mechanism operable after the severance of a blank, to move the blank to swaging mechanism. The swaging mechanism, as illustrated, comprises a rotary die arranged to be moved axially of the blank to engage the partially formed pointed end of the blank to swage it, thereby to complete the point.

In another aspect, the invention relates to a method of making fish hooks in which wire is intermittently fed past an operating station and blanks are successively severed from the wire by shearing the wire at the operating station along planes at right angles to and at an acute angle to the axis of the wire, thus producing blanks each having a pointed end portion and a formed butt portion.

These and other features of the invention are disclosed in the following specification and in the accompanying drawings, and are set forth in the claims.

In the drawings:

Fig. 8 is a side view of a fish hook blank after the butt end and the pointed end have been formed by shearing operations; and Fig. 9 is a side view of a blank with a completed point.

Figure 1:
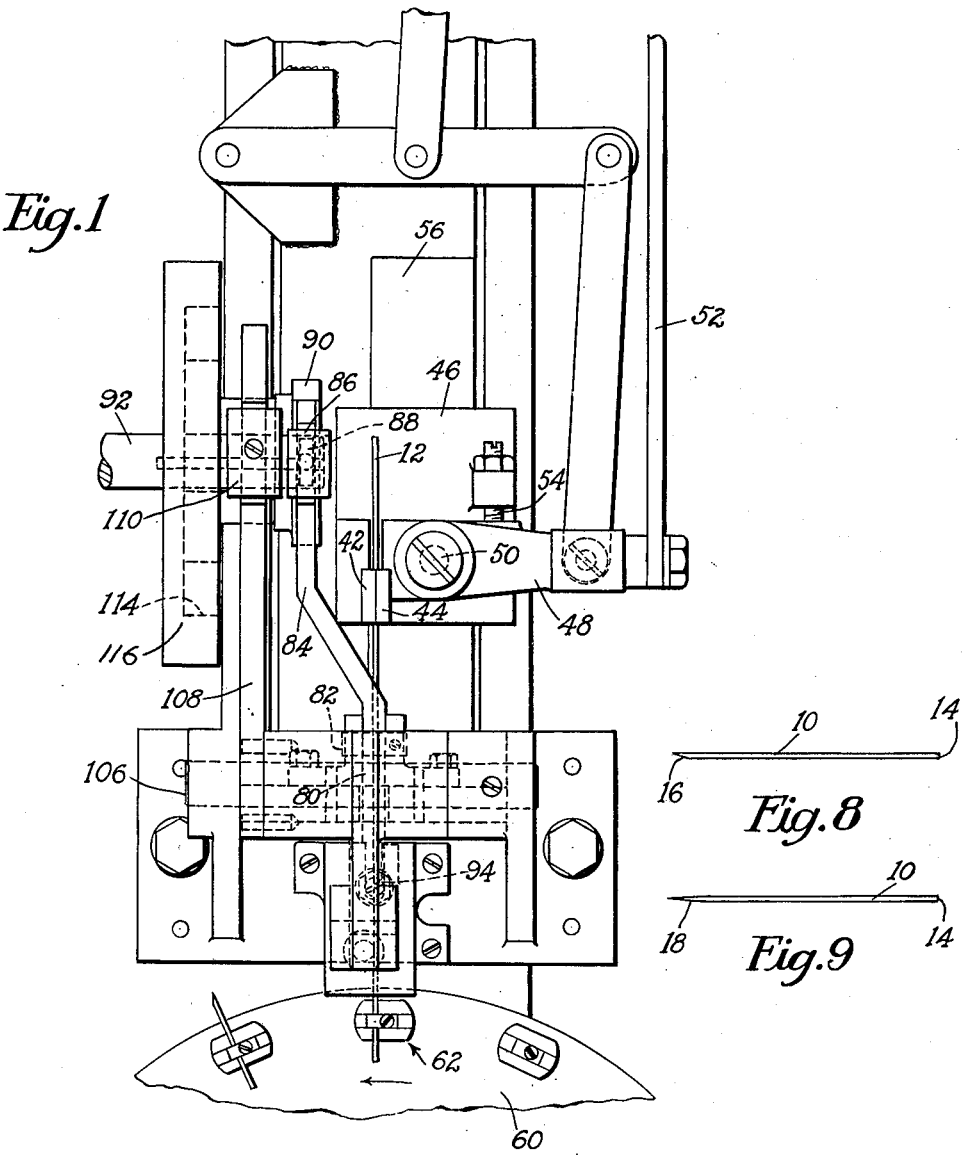
Fig. 1 is a plan view of a portion of a fish hook making machine showing the angle shear and cut-off mechanism.

The mechanism herein shown operates to sever blanks, such as blanks 10 (Fig. 8), from a length of wire 12 (Fig. 1), forming a butt end portion 14 and a pointed portion 16 (Fig. 8) by a shearing operation, and to form a completed point 18 (Fig. 9) by swaging the partially formed point 16.

Figure 3:
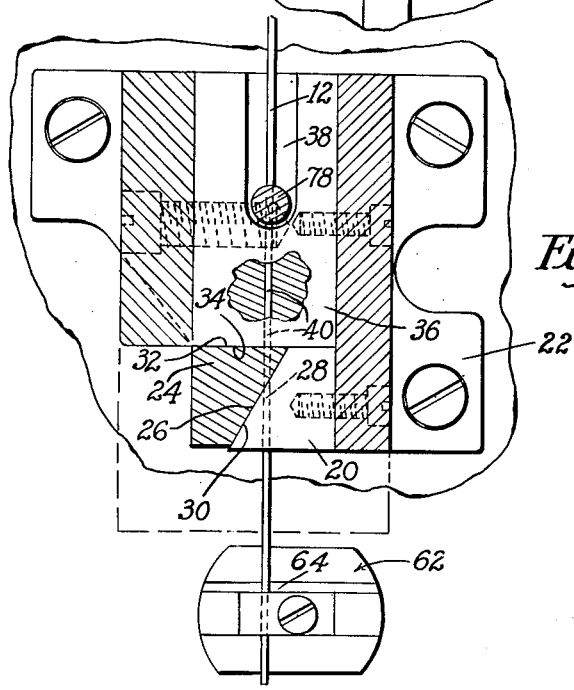
Fig. 3 is a cross-sectional view taken along line III—III of Fig. 2 and showing details of the shear mechanism.

The shearing mechanism comprises fixed shears in the form of blocks 20 and 36, best shown in Fig. 3, rigidly mounted upon the frame 22 of the machine, and a movable shear 24 mounted for movement heightwise of the fixed shears, the cooperating shear members being arranged to extend upon opposite sides of the line of feed of the wire 12 to be formed into blanks. The fixed shear 20 has an operating face 26 located in a vertical plane extending across the line of feed at an angle of about 30°, the face being slotted, as indicated by reference character 28, to provide a passage through which wire can be fed. The movable shear has a face 30 also extending vertically and in alinement with the face 26 of the fixed shear, and also has a second face 32 located in a vertical plane extending normal to and across the axis of feed. The face 32 is arranged to cooperate with a vertical face 34 of the shear block 36 to form the butt end of a blank.

The wire 12 is arranged to be advanced across an anvil 38 and through a guide opening 40 in the shear block 36 and through the elongated slot 28 of the fixed shear 20.

The means for feeding the wire comprises a pair of gripping jaws 42 and 44 (Fig. 1). The jaw 42 is fixedly secured to a slide block 46, and the jaw 44 is mounted upon a lever 48 pivoted on a stud 50 secured to the block 46. The lever is reciprocated by means of a rod 52 under control of a cam (not shown). Rearward movement of the lever relatively to the block is limited by a stop screw 54. The slide block 46 is arranged to reciprocate along a guide member 56 upon actuation of the rod 52. During the rearward movement of the lever and slide the jaw 44 is moved about its pivot away from the jaw 42, so that no force is exerted upon the wire 12. However, upon forward movement of the lever 52 and block 46, the jaws are forced together, gripping the wire and advancing it outwardly past the shear members. The length of the blank to be produced is determined by the distance which the wire is advanced past the shear members, and this in turn is determined by the amount of forward movement of the actuating rod 52. In order to hold the blanks as they are cut off from the wire there is provided a turret 60 carrying a plurality of chucks 62, each of which is arranged to receive wire as it is advanced by the wire feed mechanism. To this end, each of the chucks comprises a stationary jaw 64 and a movable jaw 66 carried at the upper end of a spindle 68 extending downwardly through the body portion of the chuck. The movable jaw is normally forced downwardly by means of a spring 70 surrounding the plunger and bearing against the lower surface of the chuck and a washer 72 upon the lower end of the plunger. The opening and closing of the jaws is controlled by a trip rod 74 actuated by a cam 76. The timing of the cam is such that the plunger is raised to open the jaws immediately prior to a feeding operation of the wire 12, after which the jaw is released so that it will grip the wire.

Figure 2:
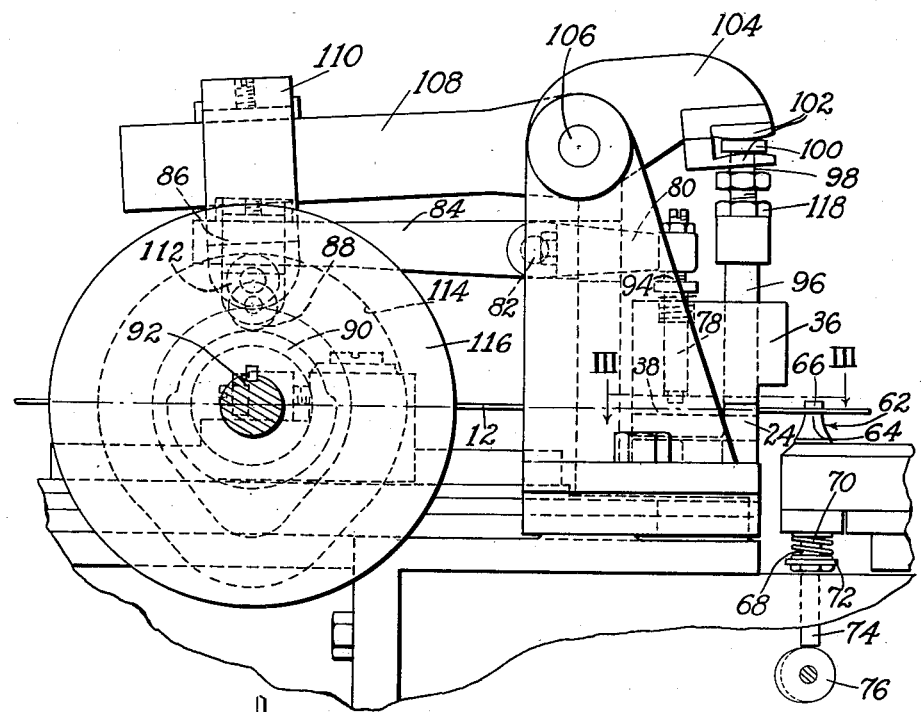
Fig. 2 is a view in side elevation of the mechanism shown in Fig. 1.

After a movement of the wire-feeding mechanism forwardly, and the chuck jaws have been closed to grip the wire, it is desirable to hold the wire to be operated upon in fixed position. To this end, additional holding mechanism is provided and comprises a holddown plunger 78 (Fig. 2) arranged to clamp the wire down upon the anvil 38. The plunger is operated by means of a lever 80 pivoted upon the frame at 82 and having a rearwardly extending end portion 84 extending through a bushing 86 which carries a cam roll 88 in engagement with a cam 90 upon a drive shaft 92. The cam 90 effects a depression, at the proper time, of the forward end portion of the lever 80 to force the plunger 78 in a downward direction. The amount of pressure of the lever upon the plunger can be varied by means of a setscrew 94.

Figure 4:
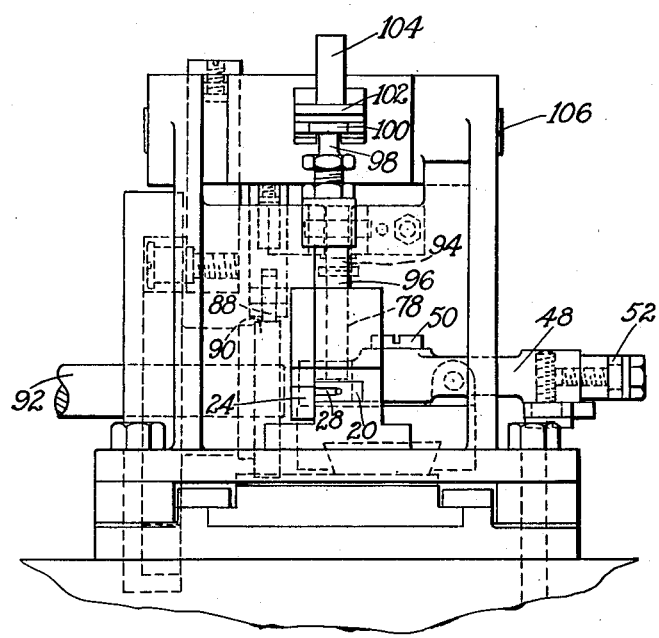
Fig. 4 is a view in front elevation of the angle shear and cut-off mechanism.
Figure 5:
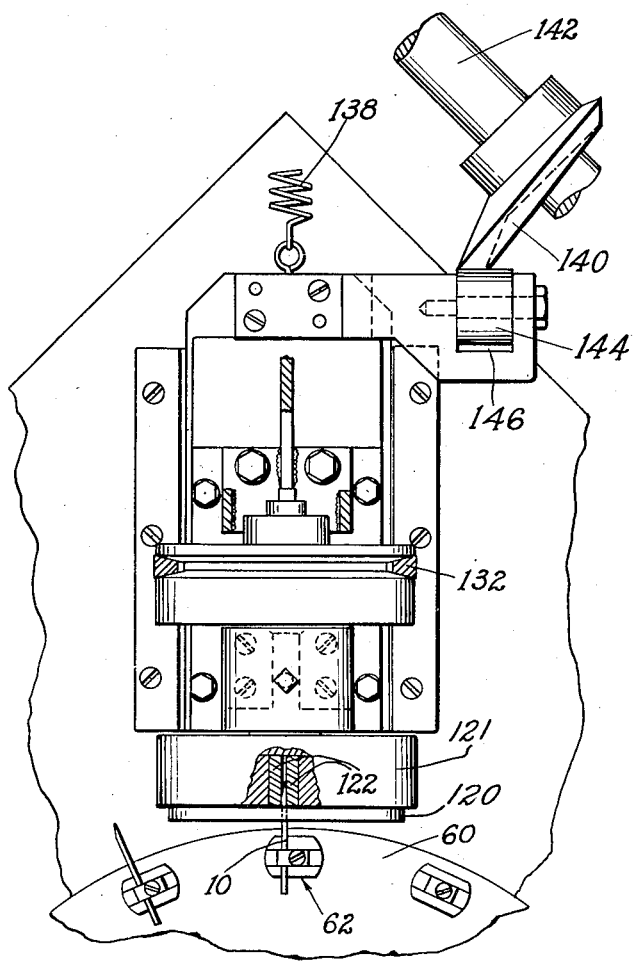
Fig. 5 is a plan view of the swaging mechanism.

The movable shear is operated by means of a vertically extending plunger 96 (Figs. 2 and 4) to which is secured a stud 98 having a head 100 located between two rocker surfaces 102 upon a bell-crank lever 104. The bell-crank lever is pivoted at 106 upon the frame of the machine and has an arm 108 extending rearwardly through a bushing 110 which carries a cam roll 112 located in a cam track 114 of a cam 116 mounted upon the drive shaft 92. Operation of the cam 116 results in the movement of the plunger carrying the movable shear 24 down and back across the surfaces 34 and 26 of the shear block 36 and the fixed shear 20. The purpose of the rocker surfaces 102 is to provide an even bearing connection between the bell-crank lever 104 and the plunger 96. Adjustment of the plunger in a heightwise direction can be made by means of a screw-threaded connection 118.

It is to be noted that the distance between the faces 30 and 32 of the movable shear, where those faces cross the path of feed of the wire 12, is comparatively small, with the result that when the movable shear descends the piece of wire cut out of the main length of wire is comparatively small. Thus there is little waste of material involved in severing the wire. Operation of the shears results in simultaneously partially forming the point of one blank and forming the butt end of the next succeeding blank. This serves to minimize the number of operations necessary in producing pointed blanks.

Figure 6:
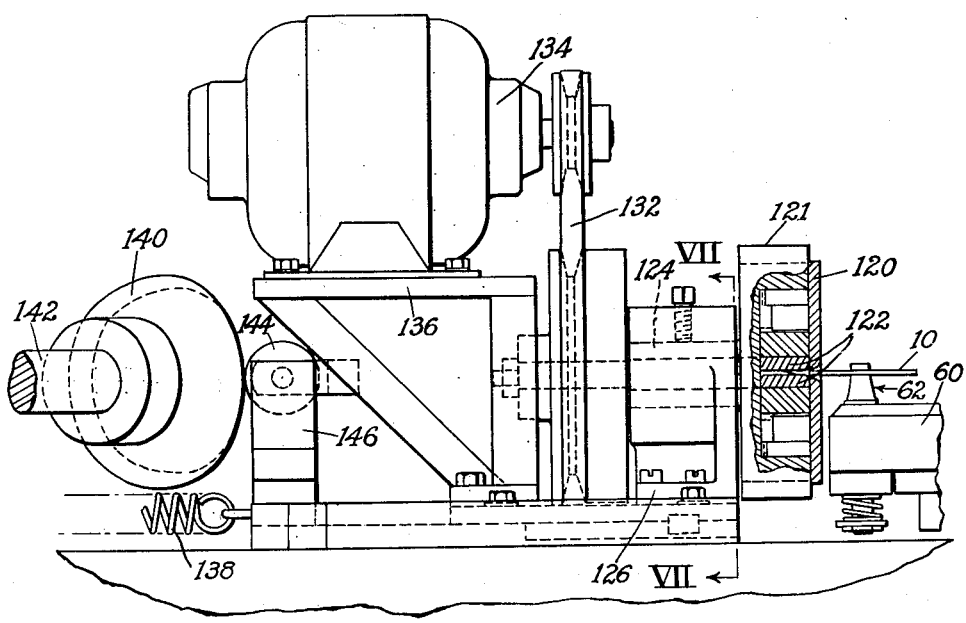
Fig. 6 is a view in side elevation of the swaging mechanism.
Figure 7:
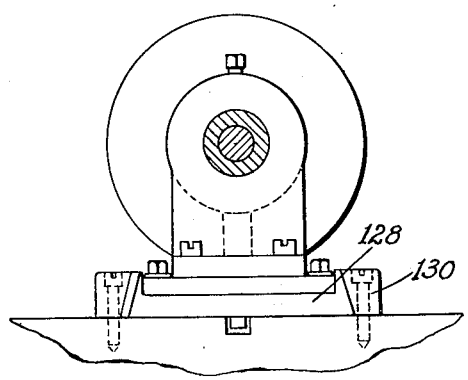
Fig. 7 is a vertical cross-sectional view of the swaging mechanism taken along line VII—VII of Fig. 6.

After the shearing operation the turret is rotated to position a chuck 62, with a partially pointed blank therein, in operative position relatively to the swaging mechanism shown in Fig. 6. The mechanism for moving the turret is not herein shown in detail, but is preferably similar to that disclosed in the aforementioned United States Letters Patent.

The swaging mechanism is of a well-known commercial type and comprises a housing 121 carrying a rotary member 120 having therein a plurality of swaging dies 122 arranged about the axis of the member. These dies are tapered as shown and roughly conform to the shape of the pointed end of a blank to be produced, outward movement of the rotary member with the dies being effective to swage a conical point upon a blank positioned axially of the member. The rotary member is mounted in a bearing 124 on a bracket 126, the bracket being mounted for movement upon a slide 128 in guideways 130. The rotary member is driven by a belt 132 by an electric motor 134 mounted upon a bracket 136 also carried by the slide 128. The slide is normally held in a withdrawn position by a spring 138 but is moved inwardly in timed relation to operation of the turret by a cam 140 on a shaft 142, and arranged to engage a roll 144 carried by a bracket 146 upon the slide 128. As the cam 140 is rotated, movement of the rotary member 120 in an axial direction is effected, thus causing the dies to swage the partially formed point 16 on a blank, as shown in Fig. 8, into a symmetrical cone-shaped point 18, as shown in Fig. 9, after which the rotary member is withdrawn out of operative relation to the blank.

Having described our invention, what we claim as new and desire to secure by Letters Patent of the United States is:

1. In a fishhook making machine, blank forming mechanism comprising a fixed shear block having an opening therethrough for the passage of wire and having an end face extending at right angles to the axis of the opening, a second fixed shear block located adjacent to the face of the first-mentioned block and having a horizontal slot opening therethrough in alinement with the opening in the first-mentioned block and a face extending angularly across the axis of the opening and forming an acute angle with the face of the first-mentioned block, a movable shear block having operating faces, respectively, parallel to the faces of the fixed shear blocks, and substantially in alinement therewith, means operable intermittently to advance wire through the openings in the fixed shear blocks, means operable in timed relation to the feeding mechanism to move the movable shear block across the line of feed of the wire to produce a blank together with means for feeding the wire blank axially and removing the severed blank sidewise through the said slot.

2. A fishhook making machine comprising means for intermittently advancing a wire in a linear direction through an operating station, a pair of shears at the operating station for successively severing blanks from the wire, the shears having two pairs of cooperating faces, one located in a plane at right angles to the wire, the other located in a plane at an acute angle to the wire, for producing a pointed end and a square end on the severed piece of wire, the said shears comprising a first fixed block, a second fixed block, and an interposed movable block, the first fixed block having a hole therein for the linear feeding of wire blank therethrough, the second fixed block having a horizontal slot for the sidewise release of a severed blank, the movable block having discharge means for cut segments, means for swaging the pointed end and an indexed carrier for carrying the severed wire from cutter to swage, the second pair of co-operating faces having a slot in the stationary member to permit the transfer of cut wire from the cutter to the swage without bending or longitudinal movement.

3. In a fishhook making machine, in combination a cutter comprising a plurality of cutter blocks having operating faces at an acute angle therebetween one having a wire feeding opening, means for feeding a wire lengthwise therethrough, another having a horizontal wire receiving slot, a third having a cutting surface adapted to make a square cut and an angle cut between wire stock and a severed piece, and an indexed clamping member adapted to receive the end of the wire stock by longitudinal movement thereof before severance and remove the severed portion by a sidewise movement thereof through said slot in the second block.

WILLIAM J. DE WITT.
HERBERT A. CORBETT.

References Cited in the file of this patent

UNITED STATES PATENTS

| Number | Name | Date |
|---|---|---|
| 156,909 | Buxton | Nov. 17, 1874 |
| 157,714 | Charnley et al. | Dec. 15, 1874 |
| 213,237 | Niemeyer | Mar. 11, 1879 |
| 300,758 | Brazelle | June 24, 1884 |
| 390,118 | Ellery et al. | Sept. 25, 1888 |
| 626,334 | McCarter | June 6, 1899 |
| 776,511 | Hall | Dec. 6, 1904 |
| 1,945,469 | Roberts | Jan. 30, 1934 |
| 2,054,335 | Nelson | Sept. 15, 1936 |
| 2,243,614 | Vogel | May 27, 1941 |
| 2,325,431 | Shippy | July 27, 1943 |
| 2,363,630 | Wales | Nov. 28, 1944 |
| 2,437,750 | Mann | Mar. 16, 1948 |
| 2,441,837 | Ness | May 18, 1948 |

FOREIGN PATENTS

| Number | Country | Date |
|---|---|---|
| 94,265 | Switzerland | Apr. 17, 1922 |